No. 626,332. Patented June 6, 1899.
F. J. MASON.
HAND TRUCK.
(Application filed Sept. 9, 1898.)
(No Model.)
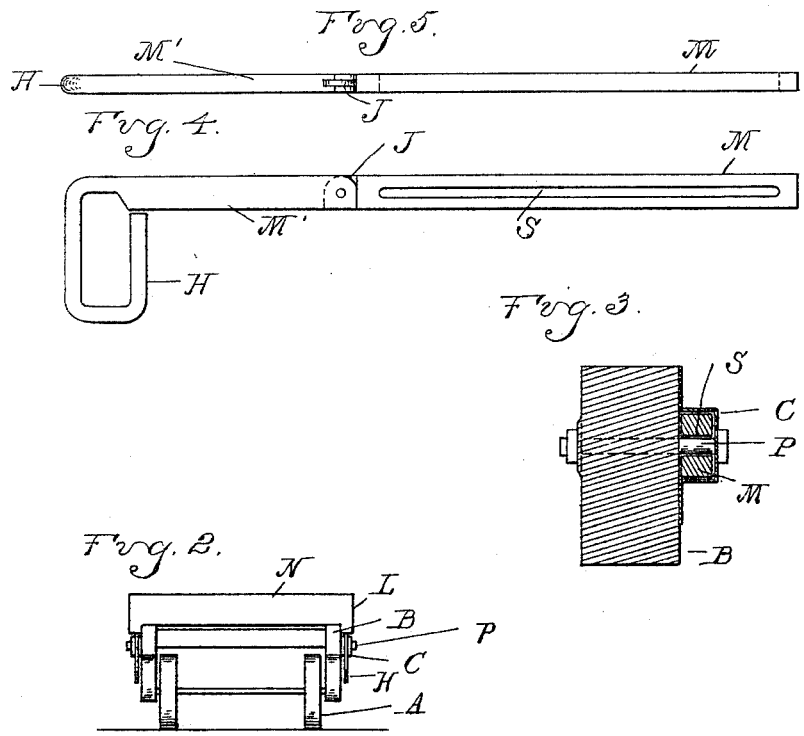
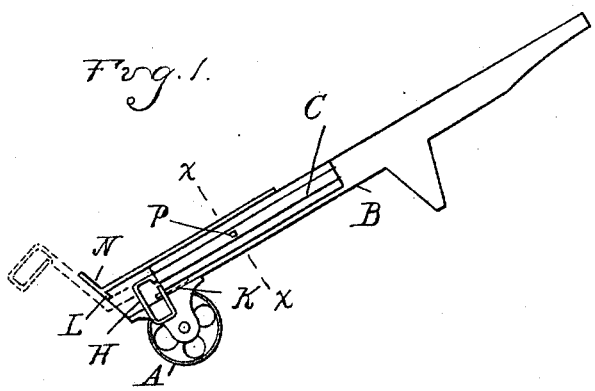
Witnesses
A. L. Hobby
P. M. Hulbert
Inventor
Frank J. Mason
By Thos. J. Sprague
Attys.

UNITED STATES PATENT OFFICE.

FRANK J. MASON, OF DETROIT, MICHIGAN, ASSIGNOR OF ONE-HALF TO JOHN F. MONAGHAN, OF SAME PLACE.

HAND-TRUCK.

SPECIFICATION forming part of Letters Patent No. 626,332, dated June 6, 1899.

Application filed September 9, 1898. Serial No. 690,563. (No model.)

*To all whom it may concern:*

Be it known that I, FRANK J. MASON, a citizen of the United States, residing at Detroit, in the county of Wayne and State of Michigan, have invented certain new and useful Improvements in Hand-Trucks, of which the following is a specification, reference being had therein to the accompanying drawings.

My invention applies to that class of hand-trucks commonly used in stores and warehouses for handling merchandise; and it consists in the peculiar construction, arrangement, and combination, with the truck, of a pair of jointed carrying-bars which (while not interfering with the ordinary use of the truck) can, if occasion should require, be quickly brought into use to provide a convenient handhold for lifting up the wheeled end of the truck, so that it may be bodily carried, with its load, over obstructions or up and down stairways where it cannot be wheeled, thus making the truck particularly applicable, for instance, in moving stoves, &c., all as more fully hereinafter described, and shown in the accompanying drawings, in which—

Figure 1 is a side elevation of a truck embodying my invention and showing in dotted lines the carrying-bars extended for use. Fig. 2 is a rear elevation of the truck as shown in Fig. 1. Fig. 3 is a cross-section on line $x\ x$, Fig. 1. Fig. 4 is a detached side elevation of one of the carrying-bars, and Fig. 5 is an edge elevation thereof.

A A are the wheels, and B the frame, of a hand-truck of the usual construction and to which my invention is applied as follows: To the side bars of the frame on the outside thereof are slidingly secured in guides C hinge-jointed carrying-bars, each composed of two parts M M'. The part M has a longitudinal slot S and is connected with the part M' by the hinge-joint J, which permits a limited movement of the part M', as will be further shown. At its free end the part M' is formed with a handhold or handle H.

The guides C are preferably constructed and arranged to form housings for the carrying-bars, and a bolt P, secured to the frame and passing through the slot S and housing, forms a guide-pin, which limits the sliding movement of the carrying-bar, all so arranged that the bar may be pulled out of the housing far enough to permit of the section M' being turned up on the hinge, as shown in dotted lines in Fig. 1. In this upturned position the handholds of the carrying-bars can be easily grasped and form a convenient means of lifting the truck up, and with the assistance of a man at the handle-bars of the truck two men can readily carry the truck, with its load, up or down a stairway or lift it over any obstruction, and when not in use it does not interfere in the slightest with the ordinary functions of the truck.

To make the construction more efficient, I have made provision whereby the section M' inclines outwardly when in position for carrying. To this end I use the nose N of the truck to hold the section M' in such inclined position by providing said nose with lateral projections or extensions L, which overhang the carrying-bars and form abutments directly at the hinge. By this means the strain in carrying the load is not borne by the housings, while at the same time the section M' is firmly supported in its inclined position, as the pins P hold the bars from being drawn out any farther.

The advantage of having the sections M' held in outwardly-inclined position is that it enables the bearer of the load to walk more freely in either direction and, further, that it distributes the load more evenly between the two bearers at the opposite ends of the truck.

It will be seen that my invention may be easily applied to other forms of hand-trucks of the character described, as it is in the nature of a simple attachment susceptible of such modification in the manner of securing the carrying-bars in the described relation to the frame as circumstances may require.

To prevent any accidental displacement of the carrying-bars when not in use, a suitable spring-catch K may be arranged to engage with the handle H.

What I claim as my invention is—

1. In combination with a hand-truck, of carrying-bars formed with suitable handholds at their carrying ends, guides on the frame slidingly connecting said bars to the frame of the truck and adapted to permit said bars to be extended a limited distance beyond the wheeled end of the truck and hinge-joints in the bars adapted to have the extended ends of said bars upturned in position for lifting the truck.

2. The combination with a hand-truck of carrying-bars formed with suitable handholds at their carrying ends, guides on the frame slidingly connecting said bars to the sides of the truck-frame and adapted to permit a limited extension of the bars beyond the wheeled end of the truck, hinge-joints in the carrying-bars and abutments at the end of the truck adapted to support the carrying-bars at the hinge-joint when the bars are extended for carrying.

3. In combination with a hand-truck, of carrying-bars formed with suitable handholds at their carrying ends, guides securing said bars to the sides of the frame of the truck and apted to permit a limited extension thereof beyond the nose of the truck, hinge-joints in the bars and abutments at the nose of the truck adapted to hold the hinged outer ends of the carrying-bars in outwardly-inclined position in carrying the truck.

4. In combination with the hand-truck of carrying-bars comprising the hinge-jointed sections M M', the housings C forming guides in which said bars are slidingly secured, the guide-pin P and slot S limiting the movement of the carrying-bars in said housings, the abutments L on the nose of the truck and the handles H on the carrying-bars.

In testimony whereof I affix my signature in presence of two witnesses.

FRANK J. MASON.

Witnesses:
   M. B. O'DOGHERTY,
   OTTO F. BARTHEL.